US00RE47186E

(19) United States
(12) Reissued Patent
Selker et al.

(10) Patent Number: US RE47,186 E
(45) Date of Reissued Patent: Jan. 1, 2019

(54) FABRIC ARTICLE FOLDING MACHINE AND METHOD

(71) Applicant: Foldimate, Inc., Oak Park, CA (US)

(72) Inventors: Ted Selker, Palo Alto, CA (US); Gal Rozov, Maabarot (IL)

(73) Assignee: FOLDIMATE, INC., Oak Park, CA (US)

(21) Appl. No.: 15/454,098

(22) Filed: Mar. 9, 2017

Related U.S. Patent Documents

Reissue of:
(64) Patent No.: 8,973,792
Issued: Mar. 10, 2015
Appl. No.: 13/677,204
Filed: Nov. 14, 2012

(51) Int. Cl.
*A41H 33/00* (2006.01)
*D06F 89/00* (2006.01)
*D06F 89/02* (2006.01)

(52) U.S. Cl.
CPC ..... *D06F 89/023* (2013.01)

(58) Field of Classification Search
CPC ..... D06F 89/00; D06F 89/02; D06F 89/023
See application file for complete search history.

(56) References Cited

U.S. PATENT DOCUMENTS 2,616,595 A * 11/1952 Arruda ..... 223/37
2,921,726 A * 1/1960 Maxwell et al. ..... 223/37
3,161,333 A * 12/1964 Lew ..... 223/37
3,181,747 A * 5/1965 Lucius et al. ..... 223/37
3,391,839 A * 7/1968 Benjamin et al. ..... 223/37
3,477,619 A * 11/1969 Lee ..... 223/37
3,869,073 A * 3/1975 Knappe et al. ..... 223/37
4,194,703 A * 3/1980 Roe ..... 242/381.3
5,074,444 A * 12/1991 Cooper ..... 223/37
5,934,523 A * 8/1999 Willett et al. ..... 223/37

FOREIGN PATENT DOCUMENTS

IL WO2012/046227 A1 4/2012

* cited by examiner

*Primary Examiner* — Catherine S Williams

(74) *Attorney, Agent, or Firm* — Womble Bond Dickinson (US) LLP

(57) ABSTRACT

A rotating rod in combination with a retractable concave/convex tape creates pairs of folds on a fabric article on a horizontal platform. A machine and method are described. The tape extends outward and downward to hold the article at a first fold location, while the rotating rod moves from below, then over and across the tape, pulling the fabric with it to create a second fold at the farthest motion of the rod. These motions are typically repeated on the other side of the article, then at right angles, created a finished, folded article of a generally rectangular shape.

31 Claims, 9 Drawing Sheets

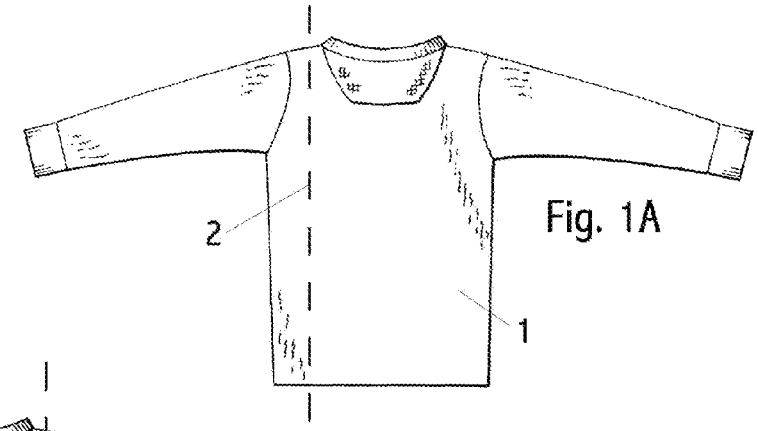
Fig. 1A
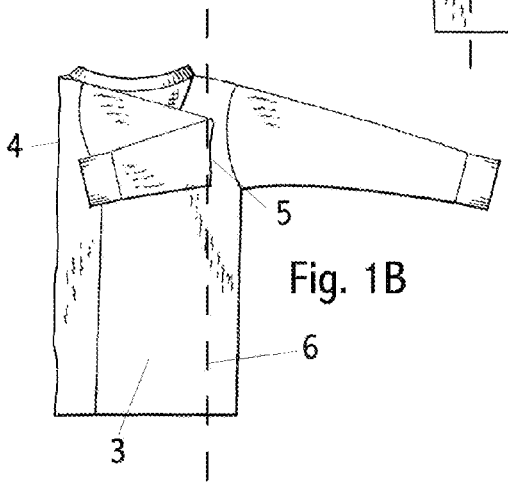
Fig. 1B
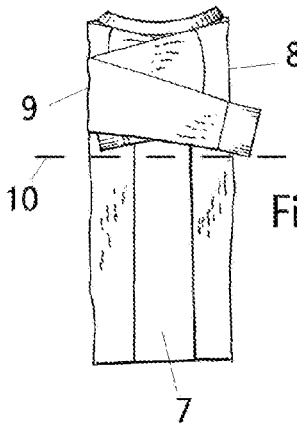
Fig. 1C
Fig. 1D
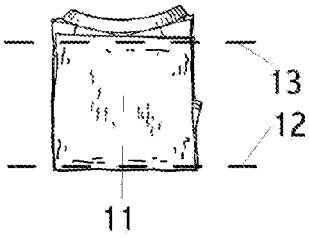

Fig. 2A
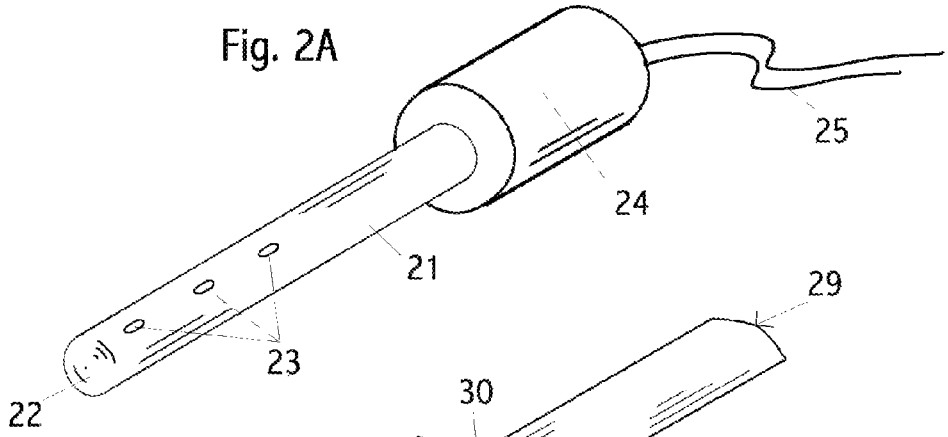
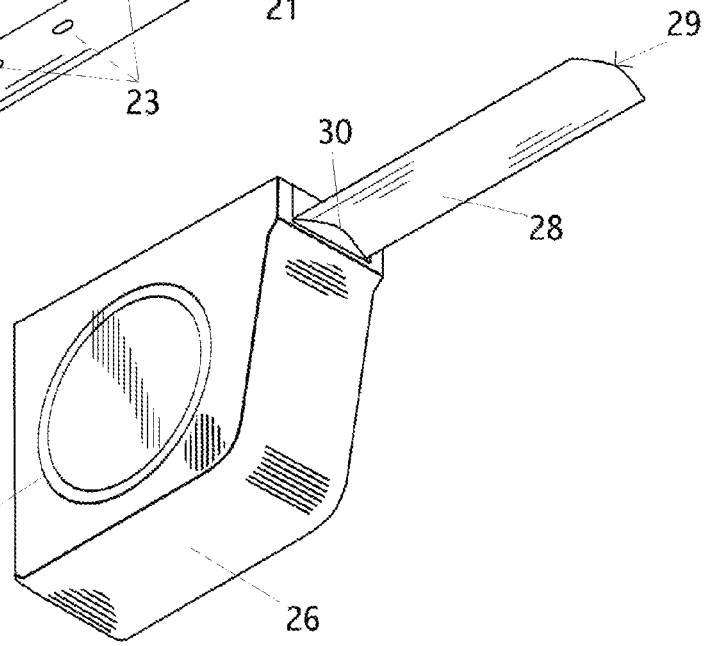
Fig. 2B
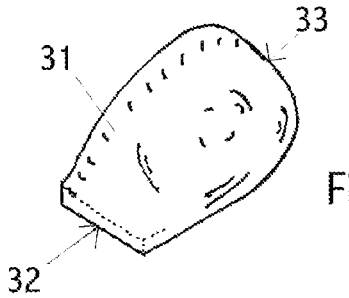
Fig. 2C

FABRIC ARTICLE FOLDING MACHINE AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

Billions of articles of clothing and linen are folded each day, by hand. There have been numerous, previous attempts to create a practical machine to fold clothes. None of these attempts have resulted in widespread adoption.

SUMMARY OF THE INVENTION

This invention folds fabric articles automatically. Example articles include shirts, sweaters, pants, and towels, in a wide range of fabric types and sizes.

Prior art has attempted to reproduce the motions a human uses to fold clothing. These include grasping a portion of the article and using the flat of the hand to guide that portion to a desired position, creating a fold as an artifact, as it were, of guiding a movable portion compared to a fixed portion of the article to a new position. Such machines were typically considerable larger than the article to be folded. Compared to prior art, this invention requires less space and also reduces wrinkling.

In the scenario below, one embodiment of the invention creates folds by a different method. A rotating rod glides smoothly between layers of the article, with portions of the article both above and below the rod. A retractable tape is used to hold a portion of the article firm while the rod moves. A first fold is created at the edge of the tape. A second fold is created at the farthest motion line of the rotating rod. This process is typically performed on the left side of a shirt, for example, then the right side, then perpendicular on the body.

The article to be folded is generally placed on a horizontal support surface, also called a platform. The rotatable rods are above the platform and below the article. The tapes extend out over the article, then down on the article to hold a portion. The platform defines an X-Y plane, with a normal Z-axis from the platform upward through the article.

The rotating rod moves in either the X- or Y-axis orthogonal to the elongate rod axis. Vertical motion permits the rod to "pick up" a portion of the article, pass over the still tape, and thus create two folds. Note that either the platform may move up and down, or the rods, or the tapes, depending on embodiment. All motions described herein are relative, and thus are equivalently accomplished by moving the other elements of the invention and the fabric article.

The rod is conveniently associated with a tape, allowing us to refer to a rod-tape pair, even though the rod and tape may be moved independently. In a most general sense, the tape "holds" the article while the rod "folds" the article. Note that these components provide other functions in the invention, as well.

In one embodiment two rod-tape pairs are used, with their elongate axes parallel, in order to both speed the folding process and simply the mechanisms.

In another embodiment two rod-tape pairs are used at right angles, in order to create folds at right angles.

In another embodiment, a total for four rod-tape pairs are used, with two parallel sets, each of the two sets at right angles.

In other embodiments, either the platform of the invention rotates, thus rotating the article, or the rod-tape pairs rotate around the article. In either embodiment, folds at various angle, including 45°, right angles, and other angles are available.

Below is an exemplary scenario for an exemplary implementation. Broader capabilities and embodiments are explained later.

An operator places a long sleeved sweater, the fabric article, face up, roughly flat, upon a horizontal platform. The operator roughly aligns the sweater with a visible outline on the platform.

The embodiment has two horizontal, rotatable rods located above the platform, the elongate axes aligned with the sweater axis through the neck of the sweater. Each rod has a free end. We refer to these rods as the first and second rods. The embodiment also has a third and fourth, similar, horizontal, rotatable rods at right angles to the first and second rods. The sweater is placed over the rods.

Associated with each rod is a retractable, bi-stable, concave-convex tape. The tape retracts, winding into a tape container, or extends outward, horizontally, over the sweater, with the same axis as its associated rod. When extended, the tape is rigid. The tape is bi-stable in that its shape changes between the extended position and the retracted, rolled position. The concave surface facing the fabric article, such that the two edges of the concave surface first contact the article. We often refer to the rods and tapes as "rod-tape pairs" for convenience, but all motions of all rods and all tapes are independent of each other. Each rod and tape has an elongate axis.

Each rod and tape has a supported end and a free end. The mounts for a rod and tape in a rod-tape pair may be on the same side of the platform, or on opposite sides. Rods move horizontally in the X-Y plane, either along the X- or along the Y-axis. Tapes move up and down in the Z-axis.

We discuss key steps, in one embodiment, to perform one pair of folds, below. It is important to note that motions are relative. For example, the sweater moving up, or the tape moving down, are equivalent motions. We choose to describe motion to aid in readability without limiting implementations. The use of a "sweater" as a fabric article being folded is purely exemplary. The key components, for this description below, are as follows: (i) a sweater, which is on a (ii) platform; (iii) a tape; and (iv) a rod. For the key steps below, the sweater is resting on the platform; it does not move independently of the platform except for the portion of the sweater being manipulated. The steps of placing the sweater (manual or automated) on the platform and removing the sweater from the platform (manual or automated) are not included in these key folding steps. The motions described below are generally relative to the other four key components, as listed above. For example, "lowering the platform," means that the sweater and the platform move downward relative to both the tape and rod, or relative to just the rod. The steps of initializing and self-testing of the invention are not included in these key folding steps.

For convenience, we organize the steps into four phases. The phases of steps are:

(I) grabbing the sweater;

(II) positioning the rod under the sweater;

(III) making the fold;

(IV) moving the rod back to first position;

(V) continuing with the next fold.

Some of the above phases are optional, depending on the article and the specific fold. For example, phase II may not be needed when the rod is already properly positioned. Phase V may not be needed if the fold just made is the final fold.

Key steps for one pair of folds are:

(I-A) the tape moves up over the sweater;

(I-B) the tape extends outward over the sweater;

(I-C) the tape lowers onto the sweater, so as to hold the sweater and define on the distal edge of the tape the fold line;

(II-A) the rod rotates in a first direction, this direction such that the upper surface of the rod rotates in the opposite direction as the next motion (IIC) of the rod while underneath a portion of the sweater;

(II-B) the rod is underneath the sweater distal to the tape; if it is not underneath the sweater, it is placed underneath the sweater;

(II-C) close to the platform, the rod moves under the sweater, while rotating, to a position as close to the distal edge of the tape as possible; this is the "pre-fold" position;

(III-A) the rotation of the rod reverses, such that the upper surface of the rod moves in the same direction as the next motion (III-C) of the rod;

(III-B) the rod is raised slightly (relative to the platform, sweater and tape), such that it will just clear the tape, without damaging the sweater, in the next motion (III-C);

(III-C) the rod moves parallel to the platform over the top of the tape; drawing a portion of the sweater with it both above and below the rod, while the portion of the sweater under the tape does not move, thus creating a first fold at the distal edge of the tape;

(III-D) the rod continues moving until it reaches the second fold position (although in some embodiments and some folds it continues past this position);

(IV-A) the rod moves parallel to the platform in the opposite direction, returning to the pre-fold position; it continues to rotate in the same direction as in (II) above, unless a snag is detected, in which case rotation is reversed; at this point the sweater has two folds: one at the first fold position as defined by the tape and a second fold position defined by the maximum movement of the rod in step (III-D);

(V-A) the tape retracts;

(V-B) additional folds may be created to repeating steps starting at (I-A).

The phrase, "the rod is close to the tape" means that the rod is as close to the tape as possible such that the fabric between the rod and tape is free to slide freely over the rod as the rod moves without damage to the fabric.

Some embodiments have a single rod and tape.

A preferred embodiment has a second rod and tape, where these are parallel to the first rod and tape. This second rod-tape pair may be used to create folds on the opposite of the garment from the first side.

A preferred embodiment has a third rod-tape pair, positioned orthogonal to the first one or two rod-tape pairs, used to create folds orthogonal to those created by the first one or two rod-tape pairs.

Typically, after the first side of the sweater is folded, then the second side is folded. The sweater now has a number of folds, all parallel to the sweater's primary axis, which we refer to as "side folds."

Optional third and fourth rod-tape pairs are used to create folds at a right angle to the side folds. We refer to these as "body folds."

Some of the above steps may be combined. For some folds, some steps may be omitted.

In some embodiments, folds are created at a suitable angle, such as 45°, from the side folds. For example, a sleeve may be folded near the shoulder at approximately 45° to place the length of the sleeve parallel to the primary axis of the article.

In one embodiment, the operator may now remove the folded sweater from the platform. In another embodiment, the invention removes the sweater from the platform automatically. The platform may tilt; or the rods may be used to lift and move the sweater; or another mechanism may move the sweater towards an output area, which may be to hold the sweater while the next article of folded, or may be a moving belt, or may be held on the platform so as to make it easy to pass a bag over the folded article and remove the bag and folded article together, for example.

In some embodiments, the operator first places the article on a "shroud" separate from the platform. The invention then moves the article of the platform so that the article is then resting on the platform.

It is a valuable feature of this invention that the rotating, moving rods also serve to remove wrinkles from the fabric of the article, and to generally straighten the article as it is folded (or, in some embodiments, prior to folding). It is a unique feature of this invention that folding and de-wrinkling occurs with the same mechanism. In some embodiments, a fluid is passed through the rod onto, into, or through the article, which may assist in dewrinkling. For example, steam may be used, exiting the rod through a series of holes. Air may be passed through the rod to aid in keeping the fabric flowing smoothly over the rod while being folded. Hot air may be used to dry an article, while it is being folded. Chemicals may be passed through the rod to aid in sanitizing or odorizing the article. Chemicals or compounds may be passed through the rod where the chemicals or compounds are used to treat the article, such as to set dye, or to treat the fabric to control bacteria and odors, such as nanoparticles of silver.

In some embodiments the direction of rotation of the rod reverses. It is advantageous in some instances to have the rod spinning opposite the direction of horizontal motion (at the point of fabric contact above the rod) when the rod is below the fabric, as this tends to smooth and de-wrinkle the fabric. It is advantageous to have the rod spinning with the direction of horizontal motion (at the point of fabric contact above the rod) when the rod is between two layers of fabric, as this tends to drag the upper material with the rod evenly. In some embodiments, rotation of the rod at the upper contact with the fabric is slightly faster than the horizontal motion of the rod. Note that spinning the rod, may, in some embodiments, assist in keeping the rod straight, permitting the use of a more flexible rod that would be ideal if the rod were not spinning. However, multiple rod spin directions are not always required. In some embodiments, the rod vibrates, instead of spins. Reversing spin direction is desirable if a snag or foreign object or contamination is detected. A very smooth rod may not require spinning. Static charge may be used, in some embodiments, to assist in keeping fabric and fabric threads away from the rod, avoiding friction, drag, wear, and possible snags.

A unique feature of this invention is that in some embodiments it is smaller, at least in one dimension that the fully extended article to be folded. For example, the sweater arms may initially hang off the side of the platform.

Multiple rod-tape pairs permit faster folding operation as more than one fold may be in process at once. Also, a subsequent fold may initiate immediately after an earlier fold because the rod-tape pair has been pre-positioned for that subsequent fold.

Speed of operation is commercially critical, as a single operator should be able to precisely fold more clothes per minute using the invention than the operator would be able to fold by hand.

In another embodiment, the rod retracts after step (III-D) above, in a third direction of motion (not counting rotating), so as to leave both the tape fold and the rod fold intact.

In some embodiments, air, steam, water, chemicals, fragrance, or nanoparticles (referred to as "rod fluids") are dispensed into or through the article as it is folded, via a the rods, the rods being hollow with openings in the rod for the rod fluid to exit the rod one or more surface locations on the article. These fluids may clean, sterilize, de-scent, de-wrinkle, press, or chemically treat the article while it is being folded. Such actions reduce or eliminate steps.

Various embodiments of this invention are most applicable for article manufacturing, retail stores, hospitality facilities, laundromats and dry cleaners, and home use, depending on embodiments, features, size, flexibility, speed, ruggedness, and cost.

Additional extensions and features of this invention include automatic identification, inspection, scanning, tagging, and packing articles. Machine learning may be incorporated to improve performance and article recognition. RFID transponders in article tags are one method of automatically identifying articles.

Worn, contaminated, or damaged articles may be detected either by sensors on the invention of by detecting that the necessary force or torque on a tape or rod is excessive (for any motion of the tape or rod where it might be in contact with the article). Such article may then undergo a difference series of actions than a non-worn, non-contaminated, undamaged article. Examples of such problems include hair, gum, sticky spots, tangled fabric, tears, pins, loose buttons, loose threads, and the like.

BRIEF DESCRIPTION OF THE DRAWINGS

FIGS. 1A, 1B, 1C, and 1D show the sequence of steps in one embodiment of a shirt being folded.

FIG. 2A shows one rod and a motor for spinning the rod.

FIG. 2B shows a tape partially retracted.

FIG. 2C shows one embodiment of a tape end.

DETAILED DESCRIPTION

Figure 3:
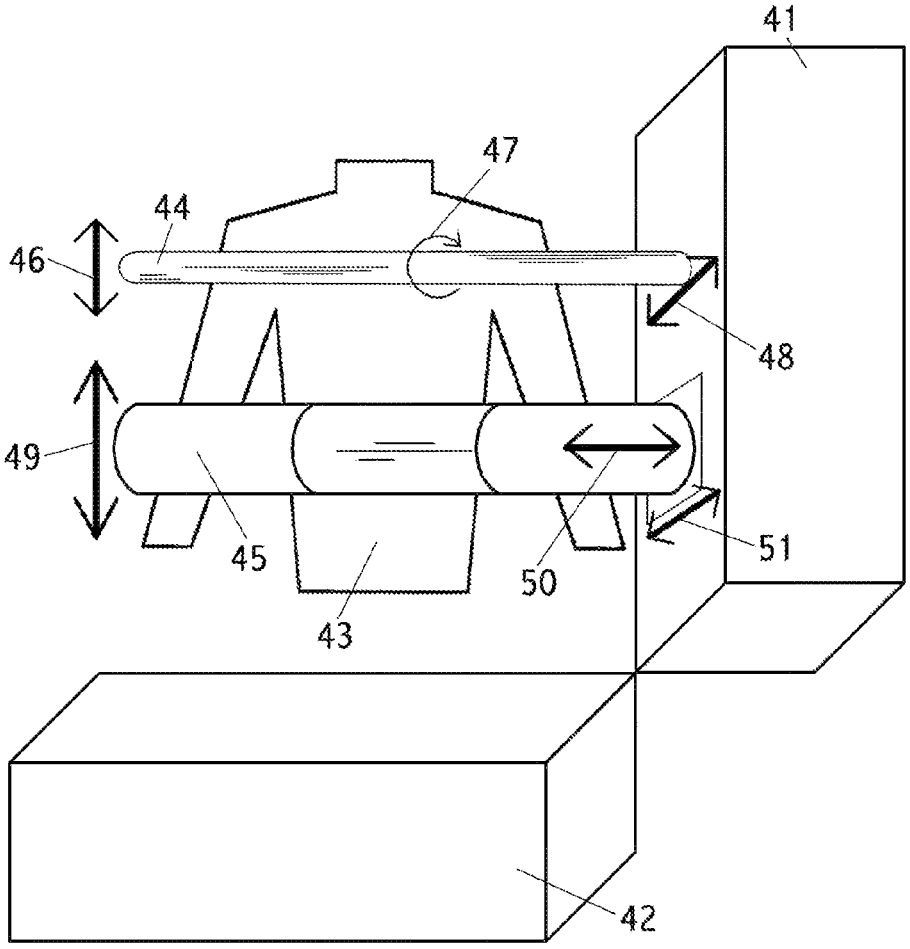
FIG. 3 shows a rod and a tape, along with their respective directions of motion relative to a fabric article to be folded.

FIG. 1A shows a fabric article, here a long-sleeve shirt, in a position to be folded. 1 is the shirt prior the start of folding. It is helpful to consider the shirt sitting roughly horizontally on a platform or table, with a Y-axis through the collar along the primary axis of the shirt; an orthogonal horizontal X-Axis, and vertical Z-axis normal to the X-Y plane on which the shirt lies. The views in FIGS. 1A through 1D are overhead views, looking down. 2 is the first fold line, which is parallel to the Y-axis. A tape (not shown in this Figure) moves over the shirt and then contacts from the shirt the shirt from above so that it's distal edge is aligned with the shown fold line 2. Contact with the shirt may be achieved in three ways. First, the tape may lower to touch the shirt. Second, the platform supporting the shirt may rise to meet the tape. Third, the tape may already be at the correct height (above or on the fabric); as the tape is extended it glides over the surface.

Refer now to FIG. 1B. Described elsewhere is the precise sequence of steps to accomplish one fold or a pair of folds. Here a rod (not shown in this Figure) is under the left side of the shirt (where "left" is as the viewer looks at this Figure), under the fabric, lifting up the fabric distal to the fold line 2, then moving to the right over the top of the tape, to the second fold line 6. This operation creates two folds: a first fold at 4, comprising the body of the shirt, and a second fold at 5, in the left sleeve. The partially folded shirt is 3. The tape, which defined the first fold at 4, now retracts.

FIG. 1C shows the shirt, 7, after the second set of two folds. These are accomplished similar to and symmetrically to the first two folds on the left side of the shirt, as shown in FIG. 1B, but are now on the right side of the shirt. In one embodiment, a second rod-tape pair is used to accomplish these two folds. 8, a fold in the body of the shirt is the third fold position. 9, in the right sleeve, is the fourth fold. Dotted line 10, parallel to the X-axis, shows the position of the fifth fold. In one embodiment the fifth and six folds are accomplished by a third rod-tape pair.

FIG. 1D shows the shirt 11 fully folded, after the fifth and sixth folds. 12 shows the fifth fold position while 13 shows the sixth fold position. The fifth and sixth folds are orthogonal to the first through the fourth folds, in this example.

The final shirt, 11, is in the form of a rectangle. The locations of the first and second fold positions (4 and 5, respectively), and the fifth and sixth (12 and 13, respectively) fold positions are generally selectable to create a desirable final size and shape of the folded article. Generally, the first and forth fold positions are similar, as viewed against the X-Y plane, as are the second and third fold positions. However, this is not necessary.

FIG. 2A shows an exemplary rod with an exemplary motor to spin the rod. The rod is 21. Rods may be solid or hollow. The rod should be reasonably rigid so that it need be supported at only one end. It should be a low-cost, non-corrosive material that will not damage the fabric articles. A suitable rod material is ¼" diameter solid aluminum. Smooth polypropylene is another suitable material. The length of the rod should be long enough, in most embodiments, to reach across the article to be folded. The end of the rod should be blunt, 22, so as to not damage the article. Here, three holes, 23, are shown in a hollow rod. A rod fluid, such as air, steam, fragrance, or many other fluids, may be moved through the rod and then onto or through the fabric. A motor, 24, may be an electric motor, here shown with electric leads, 25. It is advantageous to be able to reverse the motor direction. Here, the motor shown is a DC motor; direction may be reversed by changing the direction of current through the leads 25. Alternatively, motors may be hydraulic, wind up, or remotely connected to the rod through a mechanical or magnetic coupling.

FIG. 2B shows a partially retracted tape, 28. The concave-convex tape is bi-stable in that it has one cross-sectional shape when extended and a different cross-sectional shape when coiled in the receptacle 26. The tape may be efficiently coiled inside the receptacle, 26. The basic mechanical design of the tape and receptacle is similar to a common tape measure. Note, however, that no measurement markings are required on the tape, and that the end of the tape must be smooth so as to not catch or damage the fabric during either extension or retraction. Note also that the extension and retraction of the tape are powered, as the extension and retraction are key steps in the automatic operation of this invention. Extension and retraction may be achieved by rotating the spool around which the tape is wound, 27. Alternatively, the tape may be extended and retracted by the use of one or rollers or capstans (not shown), such as a rubber pinch roller. A device, such as a motor, for these purposes, is not shown. The end of the tape is shown, 29. However, the end of the tape 29 should not be square or sharp, but should be rounded, as will be discussed below, so as to glide smoothly over the fabric during both extension and retraction. 30 shows the point at which the tape 28 enters the receptacle 26.

A key feature of one embodiment is that the concave-convex tape is concave downward, when extended. This is "upside down" compared to the general use of most tape measures. For a tape measure, the tape is concave upward when extended to provide strength against gravity collapsing the extended tape. For this embodiment, the tape is concave downward to permit pressure to be applied between the article to be folded and the tape. From the view of the tape, this pressure is upwards. Note that the tape must be rigid enough to be self-supporting against gravity when extended, even though it is "upside down." In some embodiments the tape receptacle may be placed conveniently out of the way, such as below the support platform. One or more rollers may then be used to direct the tape between its receptacle and its extended position above or on the fabric article. A suitable tape material and dimensions are similar to, although in some embodiments stronger, than a common, heavy-duty, measuring tape. For example, coated or painted spring steel, ¾ inch wide, 20 thousands of an inch thick, about the same length as the rod in the rod-tape pair.

FIG. 2C shows an exemplary rounded tape end, 31. This tape end may be smooth, molded plastic such as a polyamide. The rounded tape end may be secured to the tape with a press fit or an adhesive. Here is shown the blunt, final end, 33, and an opening, 32 into which the end of the metal tape (shown as 29 in FIG. 2B) is inserted.

FIG. 3 shows an exemplary arrangement of a rod-tape pair positioned over an exemplary article to be folded, here a shirt, 43. In this embodiment, there are two rails, a right rail 41 and a lower rail 42. These rails support the rods and tapes, and provide the mechanical mechanisms to provide the motions of the rods and tapes. Not shown in this Figure is a platform to support the fabric article. Not shown in this Figure is a mechanism to raise and lower the platform. One rod is shown, 44, and one tape, 45. The tape, 45, is its extended position. Note, again, that we often refer to rod-tape pairs for convenience, however, the rods and tapes may be operated completely independently, and an embodiment does not need an equal number of rods and tapes. For the embodiment shown in this Figure, consider that the shirt shown, 43, is flat and horizontal. The primary axis of the shirt will be known as the Y-axis. Orthogonal to the Y-axis, but still horizontal is the X-axis. The Z-axis is vertical in this embodiment. The rod 44 is parallel to the X-axis. It has three motions: First, horizontal motion along the Y-axis, 46. Second, rotation, 47, including the ability to reverse rotation. Third, vertical motion along the Z-axis, 48. This vertical motion 48 may be implemented by raising or lowering the platform (not shown) on which the article is sitting. The tape 45 is generally parallel to the rod, 44. However, in some embodiments the tape and rod are not parallel. The tape 45 has three motions. First, horizontal motion along the Y-axis, 49. Second, extension and retraction, 50. When retracted, the end of the tape is clear of the article, 43. Third, vertical motion along the Z-axis, 48. This vertical motion 48 may be implemented by raising or lowering the platform (not shown) on which the article is sitting. Tapes may be mounted on the platform.

Figure 4:
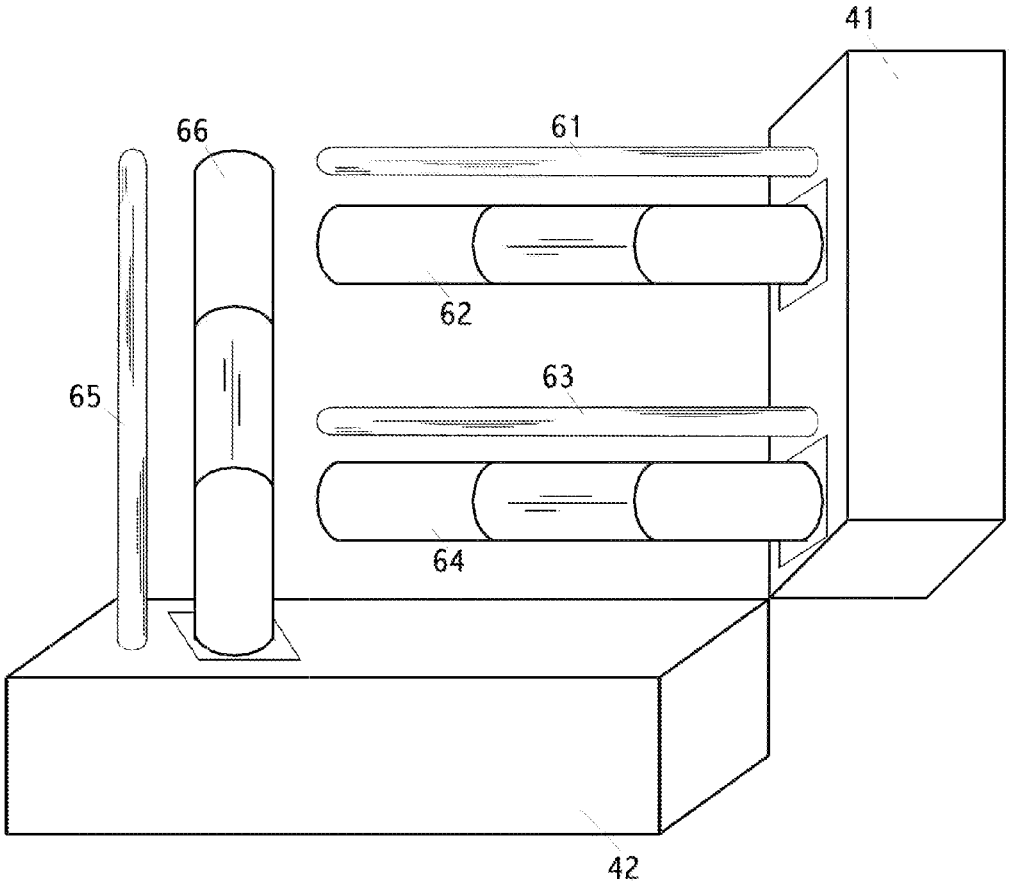
FIG. 4 shows an embodiment with two rod-tape pairs in one axis and a third rod-tape pair in another axis.

FIG. 4 shows an embodiment with three rod-tape pairs. The right frame 41 supports and provide motions for two rod-tape pairs, while the lower frame supports and provides motions for the third rod-tape pair. The first rod tape pair is 61 and 62, respectively. The second rod tape pair is 63 and 64, respectively. The third rod tape pair is 65 and 66, respectively. All three tapes, 62, 64 and 66, are shown in their extended position. Motions of the various rods and tapes must be coordinated to avoid interference. In this embodiment, there are two rails, a right rail 41 and a lower rail 42.

Figure 5A:
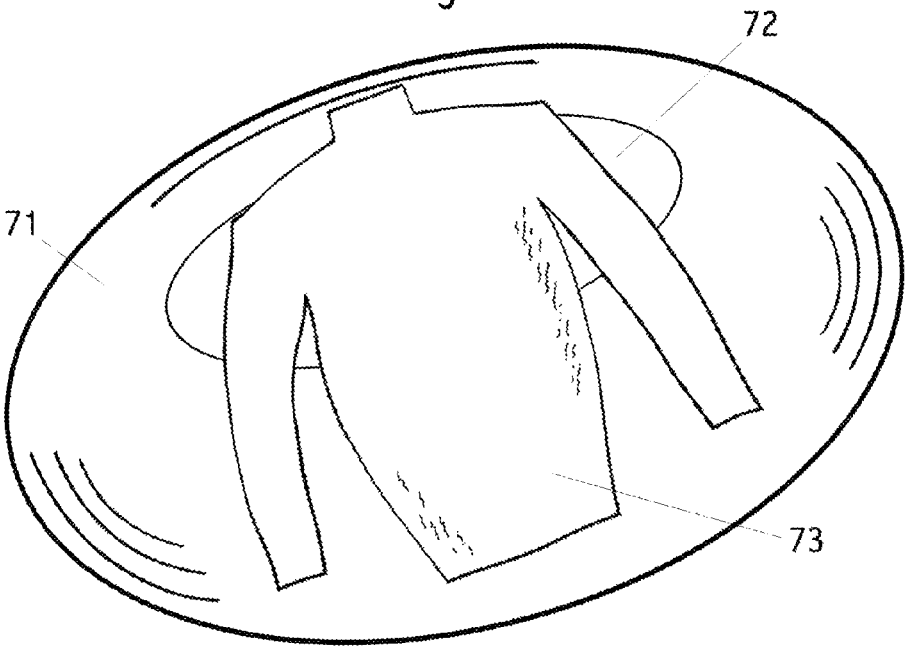
FIG. 5A shows a fabric article placed on a curved support platform.

FIG. 5A shows an article support platform 71 with an article placed on it 72. In this embodiment, the article support platform is circular and curved, with the center higher in a smooth, convex shape. This shape helps assists the user in centering and aligning an article 73 for folding. The concave surface allows the outer portions of the garment or article to drape slightly, due to gravity, spreading the article. Many other platform shapes are possible, including rectangular and flat. Here, a circle at the center of the platform, 72, assists a user in centering the article.

In one embodiment, a portion of the platform may lower between the time that a user places an article and the time the folding operation begins. This allows a user to place an article on a smooth, easily accessible platform, possibly raised for convenience. Then, the article is lowered into the invention in an area where the folding steps occur. In FIG. 5A, the center portion 72 may move separately from the outer portion 71. Note that the shown dimensions are not to scale. In one embodiment the article to be folded is "sucked into" the folding portion of the machine. A vacuum table or portion of a vacuum table may be used. In other embodiments the platform changes shape, elevation or form in order to provide both a convenient table on which a user may place an article and also provide a suitable work surface for the folding steps.

In some embodiments the article to be folded in placed directly on the platform or table used for the folding steps. In other embodiments, the article is first placed on a "shroud," or other surface, and then transferred to the folding platform. The surface in FIG. 5A may be either a shroud or the folding support platform.

Figure 5B:
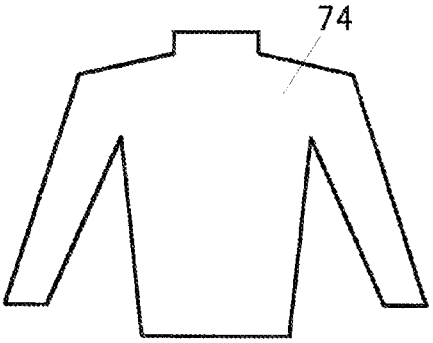
FIGS. 5B and 5C show outlines used to assist operators in placing articles on a support platform.
Figure 5C:
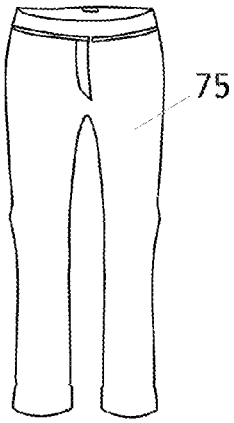

FIGS. 5B and 5C show exemplary outlines of articles to be folded. In one embodiment, one or more of these outlines are visible to users. Such outlines assist the user in proper or optimum placement of articles to be folded. Of particular importance is that the article is centered left-to-right so that the folding is symmetric, and that the article's axis is aligned with the primary folding axis, so that the fold lines are parallel to the articles primary axis. These outlines may be painted on the platform or shroud, or molded, or otherwise visible. In some embodiments, the outline is dynamically alterable. For example, the user may select a long-sleeve shirt to folded, rather than trousers. The invention then provides the outline 74 shown in FIG. 5B rather than the outline 75 shown in FIG. 5C. Such an outline may be projected from above, projected from below, or lit internally. For example, the outline may be translucent plastic embedded in an opaque platform. More than one such outline is embedded, however only one such outline is illuminated at a time. Note that the rear tag and the front fly is visible on outline 75 in FIG. 5C. These indicate an orientation that is "face-up." Visible buttons or a zipper are examples of such "face up v. face-down" orientation on an article outline. Alternatively, and image of a tors, mannequin or face may be included to provide such face-up v. face-down orientation. Such orientation symbols are helpful in some embodiments to produce a set of desirable final folds.

A variation of FIGS. 5B and 5C is the use of a torso or partial torso outline, symbol or representation. An outline or partial outline of a mannequin may be used. For example, a user may then place the article to be folded on this outline as if "dressing" the torso, partial torso, or outline.

Figure 6:
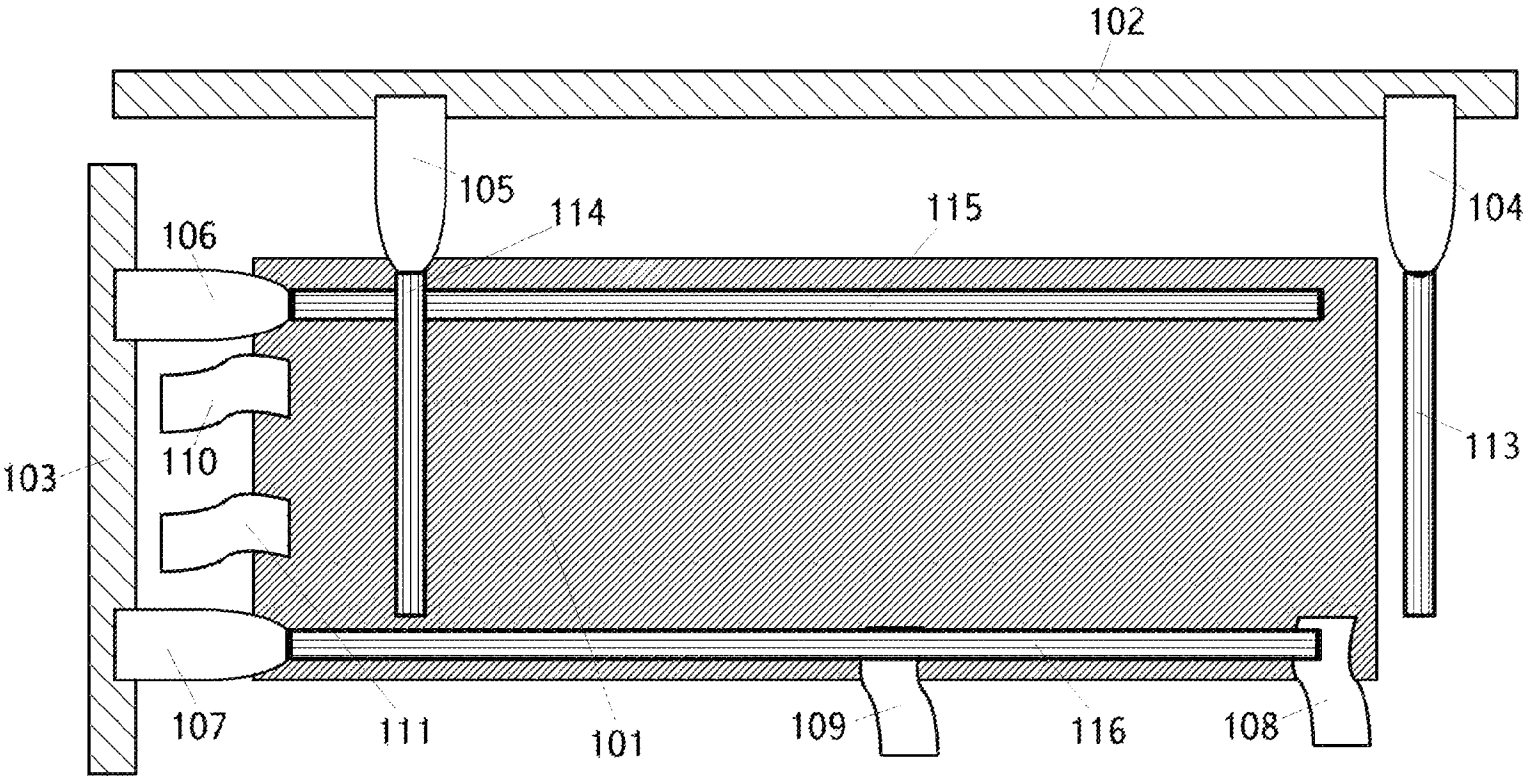
FIG. 6 shows an overhead view of one embodiment.

FIG. 6 shows an overhead view of one embodiment. The platform or table is 101. As shown, the table is generally horizontal (although it may be tilted) and defines and X-Y plane. Normal to the table is the Z-axis, where up is towards the viewer in this Figure. Two orthogonal rails, long side 102, and short side 103, are shown. These rails typically support and provide motion for the rods. This embodiment uses four rod-tape pairs. The four rod motors are 104, 105, 106, and 107. The rod motors spin four rods, 113, 114, 115, and 116, respectively. Ideally, these motors are reversible. Ideally, these motors have a mechanical, electric, electronic, or hydraulic clutch that provides a maximum rotational torque to avoid damaging the article in the event of a snag or contamination. The form of this clutch may be electronic or partially implemented in software using either the measurement of the motor current or measurement or the rotational speed, or both, to determine the effective resistance against the rotating rod. Four tapes are shown, 108, 109, 110 and 111, which may be considered part of four rod-tape pairs: 104-108, 105-109, 106-110, and 107-111. However, rods and tapes may be fully independent. In this exemplary embodiment, the four tapes are mounted on the table, 101. The four rod motors spin in either direction. The two rod motors 104 and 105 move along rail 102 in the X-axis. The two rod motors 106 and 107 move along rail 103 in the Y-axis. The rods and the rod motors may not move together. For example, a rod motor might spin a pulley, which then indirectly spins its rod. The tapes extend and retract. The tapes move in the Z-axis up and down. In some embodiments, the tapes also move in the X-Y plane. The table moves up and down. In practice, consideration must be given to mechanical interference of all components.

Figure 7:
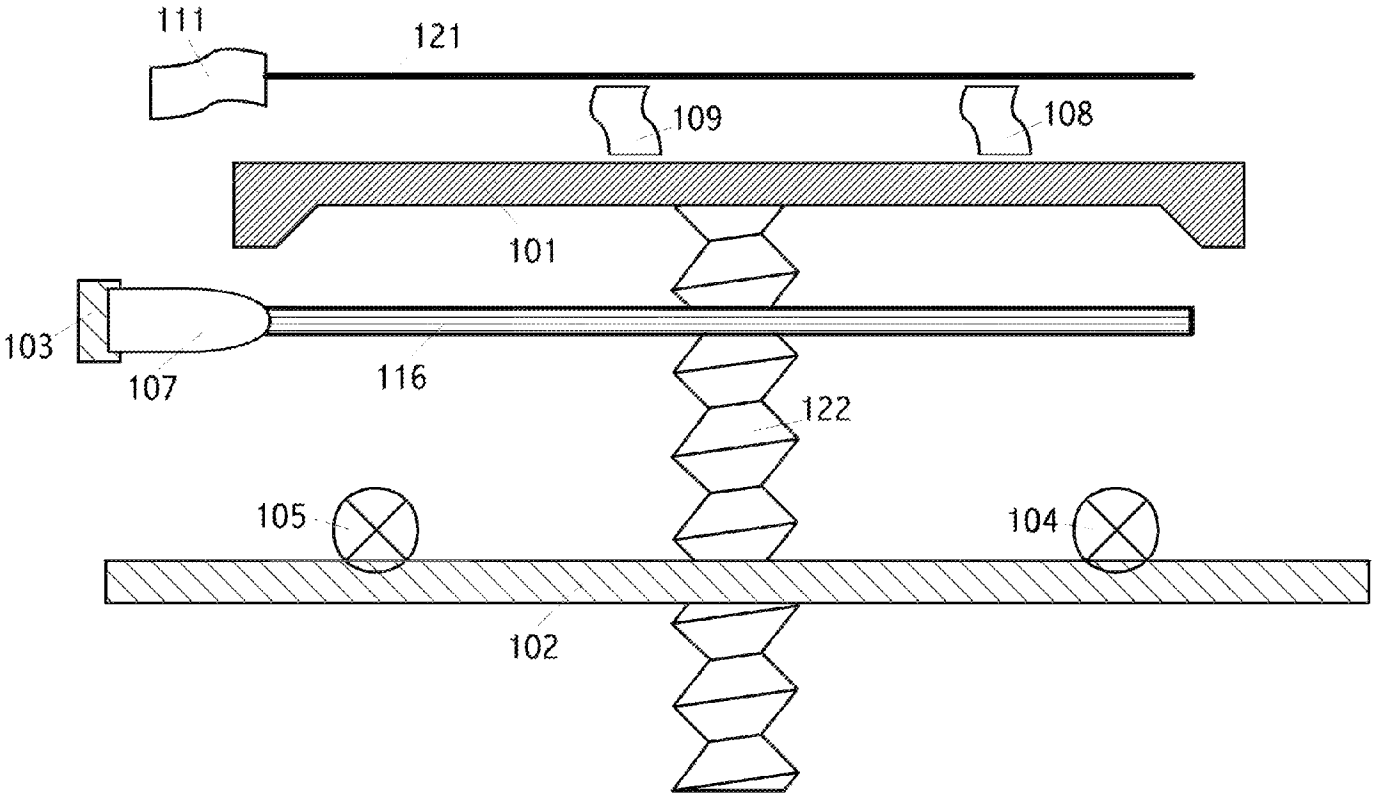
FIG. 7 shows a side view of one embodiment.

FIG. 7 shows a side view of one embodiment. The enclosure and most supporting frame elements are not shown. The long side rail 102 is shown, along with an end view of short side rail 103. Here the table 101 in a high position. The table may be raised and lowered by a variety of mechanisms, here a driven screw, 122. Mounted on the table, 101, are four tapes. Three of these tapes are visible, 108, 109 and 111. Tapes 108 and 109 are shown in end-view. Tape 111 is shown in side view, with its tape, 121, extended over the table, 101. After an article to be folded is placed on the table, 101, the table moves to a first elevation position. Generally, the first folds are long folds, folding the sides of the garment inward. Rod 116 driven by motor 107 would be used, along with tape 111, for this purpose. The first elevation position for the table is just below rod 116. When the folds at the first elevation are completed, the table 101 lowers to a second elevation. At this second elevation the top and bottom of the garment are folded. This second elevation is just below rods 104 and 105, shown in the Figure in end view. Folds at this second elevation typically use rods 104 and 105, and tapes 108 and 109. Typically, the table, 101, then moves to an appropriate elevation to discharge the completely folded article, or have it manually removed.

Figure 8:
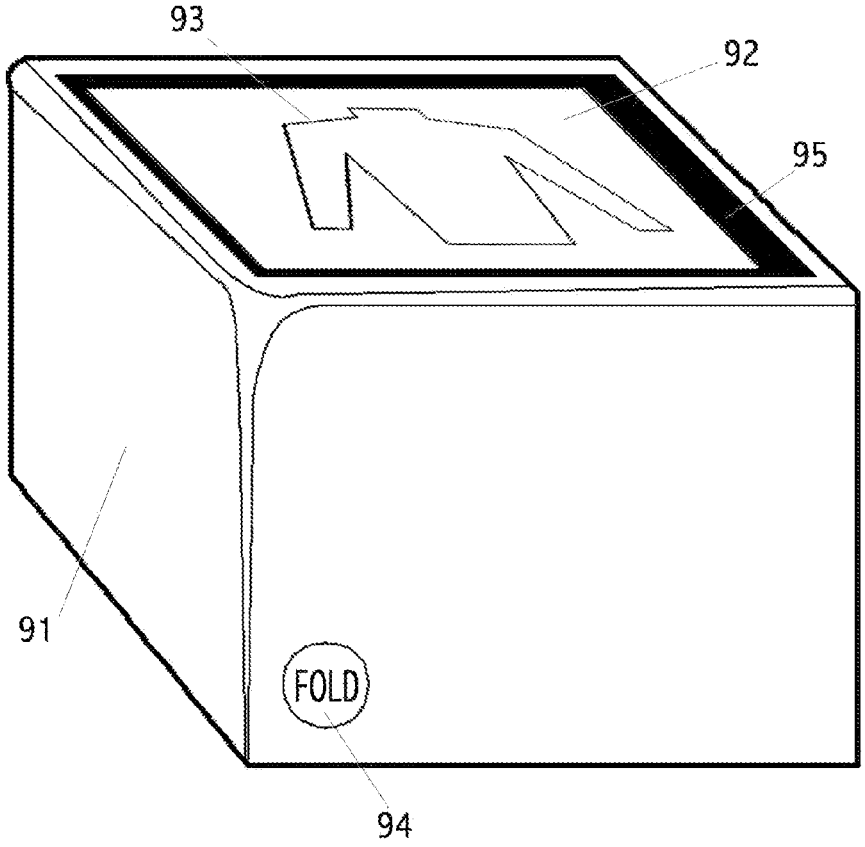
FIG. 8 shows an enclosure for one embodiment and a shroud.

FIG. 8 shows an enclosure for the mechanical elements of the invention, in one embodiment. The enclosure is 91. Either the table rises to the top of the enclosure 91 to accept an article to be folded, or a shroud is used, 92, to accept the article, which is then transferred to the folding table. An outline of the article may be visible, 93, to assist the user in placing the article. This outline may be painted, projected, or backlit, as examples. More than one outline may be available, dynamically selected, based on the type of article to be folded. After the article is placed, the user indicates that folding should start, for example, by pressing a "FOLD" button, 94. For safety reasons, the machine should stop if a hand or other foreign object is placed within the enclosure, 91. For this reason a protection zone, 95, is provided. This zone may also comprise mechanical clearance between the table or shroud, 92, and the sides of the enclosure, 91.

Figure 9A:
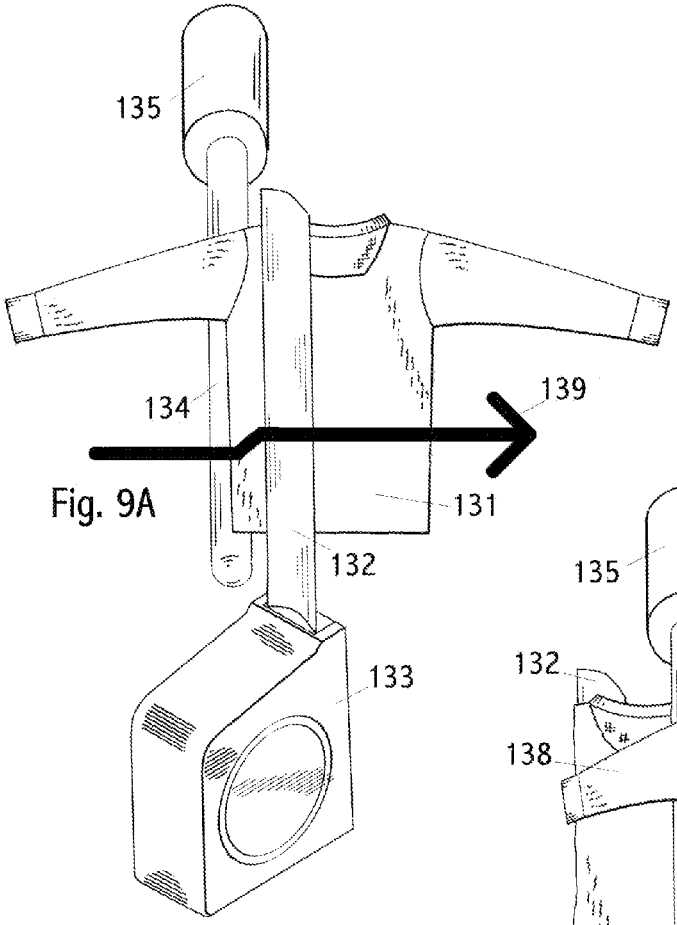
FIGS. 9A and 9B show two snapshots in an exemplary folding sequence.
Figure 9B:
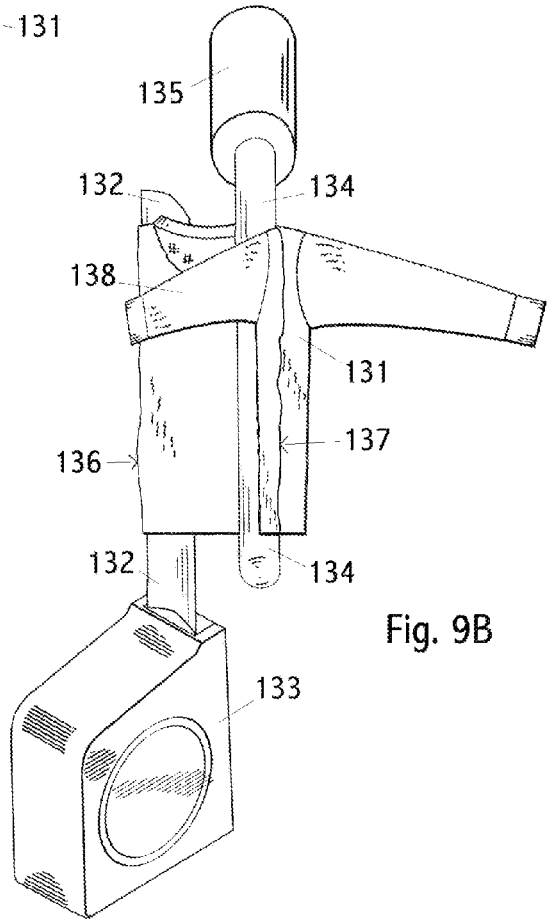

FIGS. 9A and 9B show two snapshots of an exemplary folding sequence. Prior to the snapshot of FIG. 9A, the sweater 131 is placed; the tape 132 extends over the sweater 131 and lowers onto the sweater to hold it. As described elsewhere, note that the edges of tape 132 face the sweater 131. The sweater 131 is over the rod 134, rotated by the rod motor 135. 133 shows the tape spool and spool enclosure, as described elsewhere. Thus, we see in FIG. 9A the point at which folding is about to begin. The rod 134 will move close to the tape 132; then slightly upward such that the sweater material is between the tape 132 and the rod 134, then the rod 134 will move horizontally in the direction of the arrow 139 over the top of the tape 132, pulling some of the sweater 131, including the left (as facing the sweater in this Figure) sleeve to the right, as shown by the arrow 139. The pressure of the tape 132 against the sweater 131 holds the fabric between the tape 132 and the platform (not shown) securely such that it is not pulled laterally by the rod 134.

In FIG. 9B we see the result of the motion described above. The tape 132 is in the same location as in FIG. 9A. The rod 134 has moved to the right, creating two folds: a first fold 136 defined by the distal edge of the tape 132; and a second fold 137 defined by the distal edge of the rod 134. Again we note the rod rotation motor 135 and the tape spool and enclosure 133. A this point in the folding sequence, the rod's 134 direction of rotation may reverse, as driven by the rod motor 135, then the rod may move out from under a portion of the sweater by moving in the opposite horizontal direction; that is, opposite to arrow 139. Also the tape 132 retracts into the spool 133. This latter rod motion and tape retraction steps may occur in either order, or at the same time. As a result of these folding steps, the sweater's left sleeve 138, has been neatly folded on top of the body of the sweater, 131.

Note that the sweater 131, the tape 132, and the rod 134 are not to scale in FIGS. 9A and 9B. Neither are these two Figures perspective-accurate.

In one embodiment a second rod-tape pair, with the rod starting under the sweater, then makes a second pair of folds, parallel to the two folds described above.

In one embodiment, a third, and possibly a fourth rod-tape pair, orthogonal in orientation to the first two rod-tape pairs, create one, two or more folds orthogonal to the folds 136 and 137 shown in FIG. 9B.

Sensors are an integral part of practical machine operations. Table I below lists an exemplary set of sensors.

TABLE 1

| Sensors | | |
|---|---|---|
| Sensor Purpose | No of Devices | No of Sensors of this type |
| Rod First limit | 4 Rods | 4 |
| Rod Second Limit | 4 Rods | 4 |
| Rod Position | 4 Rods | 4 |
| Tape First Limit | 4 Tapes | 4 |
| Tape Second Limit | 4 Tapes | 4 |
| Tape Extension | 4 Tapes | 4 |
| Tape Retraction | 4 Tapes | 4 |
| Tape Position | 4 Tapes | 4 |
| Tape-on-Article Contact | 4 Tapes | 4 |
| Table First Limit | 1 Table | 1 |
| Table Second Limit | 1 Table | 1 |
| Table Position | 1 Table | 1 |
| Fabric Placed Yes/No | 1 Table | 1 |
| Fabric Thickness | Variable | 1 or more |
| Safety (Hand in machine) | Variable | 1 or more |
| TOTAL | | 42 or more |

In some embodiments, a single sensor may provide more than one function as listed in Table I. In some embodiments, a physical stop may be used in place of a limit sensor. In general, limit sensors and safety sensors provide a binary output. In general position sensors provide a numerical output, which may be either analog or quantized (i.e. digital). In some embodiments, it is advantageous to know the thickness of the article, both prior to folding and during folding. Similarly, it is often advantageous to know when a tape has come in contact with the article. As those trained in the art appreciate, sensors may be mechanical, optical, use reflected IR, machine vision, electrical conductivity, encoder disks, tilt switches, and numerous other sensor technologies. As one example, a single machine vision sensor could provide the necessary information to implement a many of the sensors listed in table I, above. Additional sensors are used in some embodiments.

Operation of the machine may be guided by machine vision. A camera and machine vision software may be used to determine the centerline of an article, its outline, the type of article, rotation of the article, and foreign objects. The machine may be directed based on this information, or a warning to the user may be provided. A weight scale may be used to determine if the article is reasonably centered by the user prior to the start of folding.

Mechanisms to move the rods, tape and fabric support platform include but are not limited to: a motor, including electric, wind-up, or pneumatic; a motor attached to a screw drive or wheel; a cable on a driven wheel; with the cable attached to the moving element; air or pneumatic powered, such as by means of a piston. Return motions may be similarly powered, or may be via a spring, pneumatic pressure, or gravity. Such mechanisms may involve use of tracks, gears, levers or belts. It is not necessary that the tape coil in its retracted position.

DEFINITIONS

Article—A foldable article of fabric, such as foldable clothing, napkins, towels, pillow cases, sheets, blankets, tarps, flags, table cloths, and the like.

Concave-convex tape—A tape that when viewed from the end is curved. When the tape is extended in a straight line its preferred bend is concave. When the tape is rolled the curve flattens or reverses. Such bi-stable tapes are commonly used in tape measures. Note that the use of the tape in this invention is "upside down" from the most common orientation of such measuring tapes.

Distal—More distant from the center of the article.

Fabric—Includes woven material, cloth, and non-woven material.

Foldable clothing—Foldable clothing comprises a large number of name articles, without limitation, including shirts, blouses, pants, trousers, leggings, sweaters, jackets, dresses, skirts, gowns, ties, scarfs, tights, nylons, socks, under garments, and many more.

Primary axis of wearable clothing—For clothing for the torso, through the center of the neck. For pants, through the center of the waist.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art will appreciate.

All examples are sample embodiments. In particular, the phrase "invention" should be interpreted under all conditions to mean, "an embodiment of this invention." Examples, scenarios, and drawings are non-limiting. The only limitations of this invention are in the claims.

What is claimed is:

1. A device for folding a fabric article comprising:

a fabric support surface adapted to hold a fabric article generally horizontal;

a concave-convex tape with an elongate axis, comprising a supported end and a free end, the free end movable in a first motion along the elongate axis of the tape, in a plane generally parallel to the fabric article such that the tape has a first retracted position wherein it is not over the fabric article, and a second extended position wherein it is at least partially over the fabric article and not touching the fabric article;

a movement means that reduces the distance between the fabric article and the concave-convex tape such that from the tape's second extended position not touching the fabric article a third tape emplacement position is achieved wherein the tape is at least partially in contact with the fabric article;

a generally horizontal cylindrical rod with an elongate axis, comprising a supported end and a free end, rotatable in a first motion of rotation around its elongate axis and movable in a second rod motion, while rotating, generally horizontal and perpendicular to the rod's elongate axis; wherein the rod is located below at least a portion of the fabric article, such that this second rod motion passes over the concave-convex tape with a portion of the fabric article between the tape and the rod;

such that the second rod motion creates a fold in the fabric article defined by an edge of the concave-convex tape.

2. The device of claim 1 wherein:

the concave-convex tape is movable in a second axis that is generally horizontal and perpendicular to the first axis;

the movement means that reduces the distance between the fabric support surface and the concave-convex tape comprises the concave-convex tape movable in a third motion with a vertical axis;

the cylindrical rod is movable in a third motion with a vertical axis.

3. The device of claim 1 wherein:

the rod is adapted to spin in two opposite spin directions.

4. The device of claim 1 further comprising:

a folding machine controller, wherein the controller is adapted to perform the following steps:

(a) placing the fabric article, comprising an X-axis and an orthogonal Y-axis, on the fabric support surface in the X-Y plane, wherein the X-Y plane has a normal Z-axis where upward is defined from the fabric support surface through the fabric article;

(b) extending a concave-convex tape to extend over at least a portion of the fabric article;

(c) lowering the concave-convex tape upon the fabric article, such that the distal edge of the tape defines a first fold location wherein distal is defined relative to the center of the fabric article;

(d) spinning a rod, generally parallel to the tape, wherein the rod is under at least a portion of the fabric article, above the fabric support surface;

(e) placing the rod near the first fold location, distal to the distal edge of the tape;

(f) moving the rod generally in the X-Y plane, in a direction over the tape, to a second position, the second fold location;

(g) retracting the tape clear of the fabric article;

such that the fabric article has a first fold at the first location and a second fold at the second fold location.

5. The device of claim 1 further comprising:

a second concave-convex tape, comprising the capabilities of the first concave-convex tape, located such that its primary axis is parallel to the primary axis of the first tape;

a second generally horizontal cylindrical rod, comprising the capabilities of the first generally horizontal cylindrical rod, located such that its primary axis is parallel to the primary axis of the first rod;

such that the motions of the second tape are independent of the motions of the first tape;

such that the motions of the second rod are independent of the motions of the first rod.

6. The device of claim 1 further comprising:

a second concave-convex tape, comprising the capabilities of the first concave-convex tape, located such that its primary axis is perpendicular to the primary axis of the first tape;

a second generally horizontal cylindrical rod, comprising the capabilities of the first generally horizontal cylindrical rod, located such that its primary axis is perpendicular to the primary axis of the first rod;

such that the motions of the second tape are independent of the motions of the first tape, subject to interference limitations;

such that the motions of the second rod are independent of the motions of the first rod, subject to interference limitations.

7. The device of claim 1 further comprising:

a second concave-convex tape, comprising the capabilities of the first concave-convex tape, located such that its primary axis is parallel to the primary axis of the first tape;

a second generally horizontal cylindrical rod, comprising the capabilities of the first generally horizontal cylindrical rod, located such that its primary axis is parallel to the primary axis of the first rod;

a third concave-convex tape, comprising the capabilities of the first concave-convex tape, located such that its primary axis is perpendicular to the primary axis of the first tape;

a third generally horizontal cylindrical rod, comprising the capabilities of the first generally horizontal cylindrical rod, located such that its primary axis is perpendicular to the primary axis of the first rod a fourth concave-convex tape, comprising the capabilities of the first concave-convex tape, located such that its primary axis is perpendicular to the primary axis of the first tape;

a fourth generally horizontal cylindrical rod, comprising the capabilities of the first generally horizontal cylindrical rod, located such that its primary axis is perpendicular to the primary axis of the first rod such that the motions of the four tapes and the motions of the four rods are all independent, subject to interference limitations.

8. A method of folding a fabric article comprising:

(a) placing the fabric article, comprising an X-axis and an orthogonal Y-axis, on a platform in the X-Y plane, wherein the X-Y plane has a normal Z-axis where upward is defined from the platform through the fabric article;

(b) extending a concave-convex tape to extend over at least a portion of the fabric article;

(c) lowering the concave-convex tape upon the fabric article, such that the distal edge of the tape defines a first fold location wherein distal is defined relative to the center of the fabric article;

(d) spinning a rod, generally parallel to the tape, wherein the rod is under at least a portion of the fabric article, above the platform;

(e) placing the rod near the first fold location, distal to the distal edge of the tape;

(f) moving the rod generally in the X-Y plane, in a direction over the tape, to a second position, the second fold location;

(g) retracting the tape clear of the fabric article;

such that the fabric article has a first fold at the first location and a second fold at the second fold location.

*9. The device of claim 1, wherein the rod is hollow and is provided with a plurality of holes for supplying a fluid onto or through said fabric article.*

*10. A folding device configured to create a fold in a fabric article, comprising:*

*a fabric support surface for supporting the fabric article,*

*a first retractable tape having an elongated tape axis, the first retractable tape being adjustable between a retracted position and an extended position, and configured to apply pressure against the fabric article when in the extended position;*

*a first rod having an elongated rod axis and movable in a direction perpendicular to the tape axis; and*

*a first motor operatively connected to at least one of the first rod and the first tape;*

*wherein:*

*the first rod is configured to create a first fold in the fabric article along an edge the first tape by lifting a portion of said fabric article and moving in a first direction over the first tape.*

*11. The device of claim 10, wherein:*

*the first rod is configured to create a second fold in the fabric article by continuing in said first direction, and then reversing directions, the second fold being parallel to the first fold,*

*after the first fold is created, the first tape is configured to retract clear of the fabric article.*

*12. The device of claim 10, wherein:*

*the first tape is configured to retract clear of the fabric article, after the first fold is created.*

*13. The folding device of claim 10, further comprising:*

*a first rail supporting one end of the first rod, and configured to move the first rod in said direction perpendicular to the tape axis.*

*14. The folding device of claim 13, wherein:*

*the first rail also supports one end of the first tape; and*

*the first rail is configured to selectively move at least one of the first rod and the first rail vertically and/or horizontally, relative to the fabric article.*

*15. The folding device of claim 10, further comprising:*

*a second retractable tape and a second rod; wherein:*

*both the second retractable tape and the second rod are perpendicular to the first retractable tape and the first retractable rod.*

*16. A folding device configured for creating a fold in a fabric article comprising:*

*a fabric support surface for supporting the fabric article,*

*a retractable holding member having an elongated holding axis and adjustable between a retracted position and an extended position;*

*a folding member having an elongated folding axis and movable in a direction perpendicular to the holding axis, the folding member configured to create a fold in the fabric article along the holding member by carrying at least a portion of the fabric article over the holding member;*

*a motor operatively connected to at least one of the holding member and the folding member; and*

*a movement means configured to adjust a distance between the holding member and the fabric article;*

*wherein the holding member is configured to retract and leave the fold.*

*17. The folding device according to claim 16, wherein at least one dimension of the support surface is smaller than a corresponding dimension of the fabric article, in a plan view of the support surface.*

*18. The folding device according to claim 16, wherein at least one dimension of the folding device is smaller than a corresponding dimension of the fabric article, in a plan view of the support surface.*

*19. The folding device according to claim 16, wherein the folding member includes fluid or gas conveying channels, and is configured for fabric treatment via said channels.*

*20. The folding device according to claim 16, wherein the holding member is a concave-convex tape.*

*21. The folding device according to claim 20, wherein the holding member is concave towards the support surface.*

*22. The folding device according to claim 16, wherein the holding member has a rounded edge end portion.*

*23. The folding device according to claim 16, wherein the folding member is a cylindrical rod.*

*24. The folding device according to claim 16, wherein the folding member is configured to rotate about the folding axis.*

*25. The folding device according to claim 24, wherein the folding member is configured to rotate two opposite directions.*

*26. The folding device according to claim 16, wherein the folding member is configured to vibrate to overcome entanglement or snags in the fabric.*

*27. The folding device according to claim 16, wherein the folding device comprises detection sensors configured to detect fabric contaminations or damage.*

*28. The folding device according to claim 16, wherein the folding member is not retractable.*

*29. The folding device according to claim 16, comprising:*

*first and second holding members and first and second folding members arranged in pairs, each pair comprising one holding member and one folding member, wherein:*

*the first pair is oriented perpendicular to the second pair.*

*30. The folding device according to claim 29, comprising four pairs of holding and folding members.*

*31. A folding device configured to fold a fabric article, comprising:*

*a fabric support surface for supporting the fabric article generally horizontal;*

*a retractable holding member having an elongated holding axis and adjustable between a retracted position and an extended position, the holding member comprising a supported end and a movable free end, the holding member not overlapping the fabric article in the retracted position, and at least partially overlapping the fabric article in the extended position;*

*a generally horizontal elongated folding member with an elongated folding axis, the folding member being movable in a direction generally perpendicular to the holding axis; and*

*a movement means configured to adjust a distance between the fabric article and the holding member;*

*wherein:*

*during operation of the device, the folding member is initially located under at least a portion of the fabric article, and then passes over the holding member carrying a portion of the fabric article between the holding member and the folding member, such that the folding member's motion creates a fold in the fabric article defined by a shape or outline of the holding member.*

* * * * *